United States Patent
Mansbridge

(10) Patent No.: US 7,623,795 B1
(45) Date of Patent: *Nov. 24, 2009

(54) DATA COMPRESSION APPARATUS AND METHOD THEREFOR

(75) Inventor: John Mansbridge, Eastleigh (GB)

(73) Assignee: Roke Manor Research Limited, Romsey (GB)

( * ) Notice: Subject to any disclaimer, the term of this patent is extended or adjusted under 35 U.S.C. 154(b) by 748 days.

This patent is subject to a terminal disclaimer.

(21) Appl. No.: 10/048,400

(22) PCT Filed: Jun. 22, 2000

(86) PCT No.: PCT/EP00/05768

§ 371 (c)(1),
(2), (4) Date: Jun. 6, 2002

(87) PCT Pub. No.: WO01/10165

PCT Pub. Date: Feb. 8, 2001

(30) Foreign Application Priority Data

Jul. 30, 1999 (GB) .................................. 9917880.8

(51) Int. Cl.
  *H04B 10/00* (2006.01)
(52) U.S. Cl. ........................ 398/199; 398/182; 398/200; 398/183
(58) Field of Classification Search .......... 398/182–201
  See application file for complete search history.

(56) References Cited

U.S. PATENT DOCUMENTS

| | | | |
|---|---|---|---|
| 4,588,957 A | | 5/1986 | Balant et al. ................. 330/4.3 |
| 4,928,316 A | * | 5/1990 | Heritage et al. ............. 398/199 |
| 5,099,471 A | * | 3/1992 | Tsukada et al. ............... 398/98 |
| 5,105,294 A | * | 4/1992 | Degura et al. ............... 398/199 |
| 5,113,278 A | * | 5/1992 | Degura et al. ............... 398/199 |
| 5,121,240 A | * | 6/1992 | Acampora ................... 398/101 |

(Continued)

FOREIGN PATENT DOCUMENTS

GB 2 269 953 A 2/1994

(Continued)

OTHER PUBLICATIONS

GB Search Report under Section 17; May 19, 2000.

(Continued)

*Primary Examiner*—Agustin Bello
(74) *Attorney, Agent, or Firm*—Crowell & Moring LLP

(57) ABSTRACT

Routers for trunk telecommunication systems currently operate at 2.5 Gb/s. Next generation routers will be required to switch 128 input data streams into 128 output data streams, each data stream being at a data rate of 10 Gb/s. Current routers employ massively parallel electronic switches to route data at 1.25 Gb/s. Such technology is reaching its limit and a new approach to high-speed switching is required. The present invention provides an apparatus and method for enabling such high-speed switching by providing a data compression apparatus which comprises a pulsed chirped laser (226) coupled to a modulator (218, 220), the modulator (218, 220) being coupled to a compressor (228, 230). A chirped laser pulse having the duration of a data packet is modulated with data received on an input channel and then passed through the compressor (228, 230) in order to generate a compressed modulated data pulse for high speed switching.

11 Claims, 4 Drawing Sheets

U.S. PATENT DOCUMENTS

| | | | |
|---|---|---|---|
| 5,450,225 A | | 9/1995 | Bostica et al. ............... 359/139 |
| 5,517,346 A | * | 5/1996 | Eckstein et al. ............. 398/161 |
| 5,546,415 A | * | 8/1996 | Delfyett et al. ............... 372/25 |
| 5,574,586 A | * | 11/1996 | Chu et al. ...................... 398/53 |
| 5,631,758 A | * | 5/1997 | Knox et al. .................... 398/75 |
| 5,633,885 A | * | 5/1997 | Galvanauskas et al. ....... 372/25 |
| 5,703,706 A | * | 12/1997 | Eckstein et al. ............... 398/80 |
| 5,786,918 A | * | 7/1998 | Suzuki et al. .................. 398/98 |
| 5,815,295 A | * | 9/1998 | Darcie et al. ................... 398/72 |
| 5,815,307 A | * | 9/1998 | Arbore et al. ............... 359/328 |
| 5,841,560 A | * | 11/1998 | Prucnal ...................... 398/101 |
| 5,926,297 A | * | 7/1999 | Ishikawa et al. .............. 398/43 |
| 6,108,474 A | * | 8/2000 | Eggleton et al. ............. 385/122 |
| 6,163,638 A | * | 12/2000 | Eggleton et al. .............. 385/37 |
| 6,198,568 B1 | * | 3/2001 | Galvanauskas et al. ..... 359/332 |
| 6,449,408 B1 | * | 9/2002 | Evans et al. ................... 385/27 |
| 6,457,178 B1 | * | 9/2002 | Slim .......................... 725/127 |
| 6,493,335 B1 | * | 12/2002 | Darcie et al. ................ 370/344 |
| 6,577,414 B1 | * | 6/2003 | Feldman et al. ............... 398/43 |
| 6,823,141 B2 | * | 11/2004 | Miyauchi et al. ............ 398/147 |
| 6,895,023 B2 | * | 5/2005 | Fice et al. .................... 370/509 |
| 6,978,091 B1 | * | 12/2005 | Needle ......................... 398/72 |
| 7,043,164 B1 | * | 5/2006 | Cotter ........................ 398/175 |
| 7,190,903 B1 | * | 3/2007 | Combs et al. .................. 398/71 |
| 2001/0030785 A1 | * | 10/2001 | Pangrac et al. .............. 359/125 |
| 2003/0152392 A1 | * | 8/2003 | Mansbridge ................ 398/199 |
| 2004/0264964 A1 | * | 12/2004 | BuAbbud .................... 398/72 |

FOREIGN PATENT DOCUMENTS

| | | |
|---|---|---|
| JP | 07-123073 | 5/1995 |
| JP | 7-131419 | 5/1995 |
| JP | 07-131441 | 5/1995 |

OTHER PUBLICATIONS

Jinno M. et al—"Ultrafast All-Optical Cell Expander For Photonic Asynchronous Transfer-Mode Networks" Proceedings of the Optical Fiber Communication Conference, U.S. New York, IEEE, vol. Conf. 14, Feb. 18, 1991 (p. 49—XP000270350) ISBN: 1-55752-166-2, p. 49, left-hand column figures 1.2).

* cited by examiner

DATA COMPRESSION APPARATUS AND METHOD THEREFOR

CROSS REFERENCE TO RELATED APPLICATIONS

This application is related to co-pending U.S. patent application Ser. No. 10/181,569, by the same Applicant.

The present invention relates to a data compression apparatus of the type used in routers for digital telecommunication systems, for example, trunk digital telecommunication systems. The present invention also relates to a method of data compression for use with the data modulator apparatus.

Trunk digital communication systems comprise a network of optical fibres carrying high-speed digital data between routing nodes. At each routing node, a stream of digital data propagated by the optical fibres is divided into packets of data which are switched to different routes on a packet-by-packet basis. The stream of digital data is switched by devices known as routers (or switches).

Typically, a router comprises 128 input ports and 128 output ports for switching 128 input data streams to 128 output data streams, currently at an operating data rate of 2.5 Gb/s. A basic function of the router is to ensure that data present at all of the input ports is available at all of the output ports.

Known routers employ high-speed electronics to convert the input stream from a single, optical, data stream to a number of parallel, electronic data streams at a lower data rate. Packets of information are switched using massively parallel network of switches, the electronic data streams being converted back to a single, optical, high-speed data stream at an output port.

The next generation of trunk digital telecommunication systems will operate at 10 Gb/s and will require a new generation of routers to handle such high data rates. Consequently, it has been proposed to switch the optical data streams in the optical domain, rather than converting the signals back to the electronic domain for switching. However, current optical technology cannot implement the logical operations required for routing the data packets through routers. Hence, the next generation of routers is likely to have an optical data path with conventional electronics carrying out logical operations.

One such router architecture employs a Time Division Multiplexing (TDM) technique which involves the multiplexing of all the input data streams into a single very high-speed data stream. The single very high-speed data stream is applied to all output ports of the router, each output port being arranged to select data destined for the particular output port.

Referring to FIG. 1, a known TDM router architecture is shown. For the purposes of simplicity of description and hence clarity, only four of the 128 input/output channels are shown. As described above, the router 100 comprises a first, a second, a third and a fourth input channel 102, 104, 106, 108. The first input channel 102 comprises an optical fibre 110 carrying a first input data stream (not shown) which is converted to a 10 Gb/s electronic data stream 112 so that necessary routing calculations and buffering can be carried out. The buffered data bits representing the first input data stream are then converted back to an optical data stream 114. The optical data stream 114 then undergoes bit compression by optical pulse compression unit 116 so that a bit period of 100 ps is transformed to a bit period of about 0.8 ps. Subsequently, the very short pulses constituting the compressed data stream are multiplexed with similarly compressed pulses from other input channels, for example, the second, third and fourth input channels 104, 106, 108 to form a 1.28 Tb/s aggregate serial data stream. The aggregate serial data stream is then supplied to each of a plurality of respective optical demultiplexers which are arranged to select data destined for the output ports respectively coupled to the optical demultiplexers 120, for example, a first output port 122 to which a respective first optical demultiplexer 120 is coupled.

However, the implementation of optical demultiplexers operating at 1.28 Tb/s is very challenging due to the high data rate involved. Consequently, a router employing the above-described architecture is complex, bulky and costly to implement and therefore unsuitable for use in a commercial router.

It is therefor an object of the present invention to provide a data compression apparatus and a method therefor which obviate or at least mitigate the problems encountered when employing the above-described router architecture.

According to a first aspect of the present invention there is provided a data compression apparatus comprising a source of coherent electromagnetic radiation coupled to a pulse compressor via a modulator, wherein a pulse of electromagnetic radiation generated by the source has a chirp and the modulator is arranged to modulate the pulse with continually varying data to form a modulated pulse, the propagation time through the pulse compressor of the modulated pulse being linearly dependant upon the frequency of the electromagnetic radiation constituting the modulated pulse.

Preferably, the chirp is linear.

Preferably, the continually varying data is packet data.

Preferably, the pulse compressor is a propagation medium, for example, an optical fibre. Alternatively, the pulse compressor may be a dispersive fibre grating.

Preferably, the propagation medium has controlled dispersion characteristics.

Preferably, the modulated pulse has a leading end and a lagging end, the lagging end being arranged to travel faster than the leading end of the modulated pulse. More preferably, a property of the propagation medium is such that the lagging end of the modulated pulse exiting the medium is closer to the leading end of the modulated pulse than when the modulated pulse was first launched into the medium.

Preferably, the source of electromagnetic radiation is a laser.

It is thus possible to provide optical packet compression which does not suffer from any of the above-described disadvantages.

According to a second aspect of the invention, there is provided a data decompression apparatus comprising a detector of electromagnetic radiation coupled to a modulator via a pulse decompressor, wherein the modulator is arranged to select a compressed modulated pulse from a stream of compressed pulses, the selected compressed modulated pulse of electromagnetic radiation propagating within the decompressor in a time dependent on the frequency of the electromagnetic radiation so as to decompress the compressed modulated pulse.

The above described apparatus may be implemented in a router.

According to the present invention, there is also provided a method of compressing data comprising the steps of: providing a source of coherent electromagnetic radiation capable of generating a pulse having chirp; modulating the pulse with continually varying data to form a modulated pulse; and launching the modulated pulse into a pulse compressor, wherein the propagation time through the pulse compressor of the modulated pulse is linearly dependent upon the frequency of the electromagnetic radiation constituting the modulated pulse.

At least one embodiment of the invention will now be described, by way of example, with reference to the accompanying drawings, in which.

Figure 1:
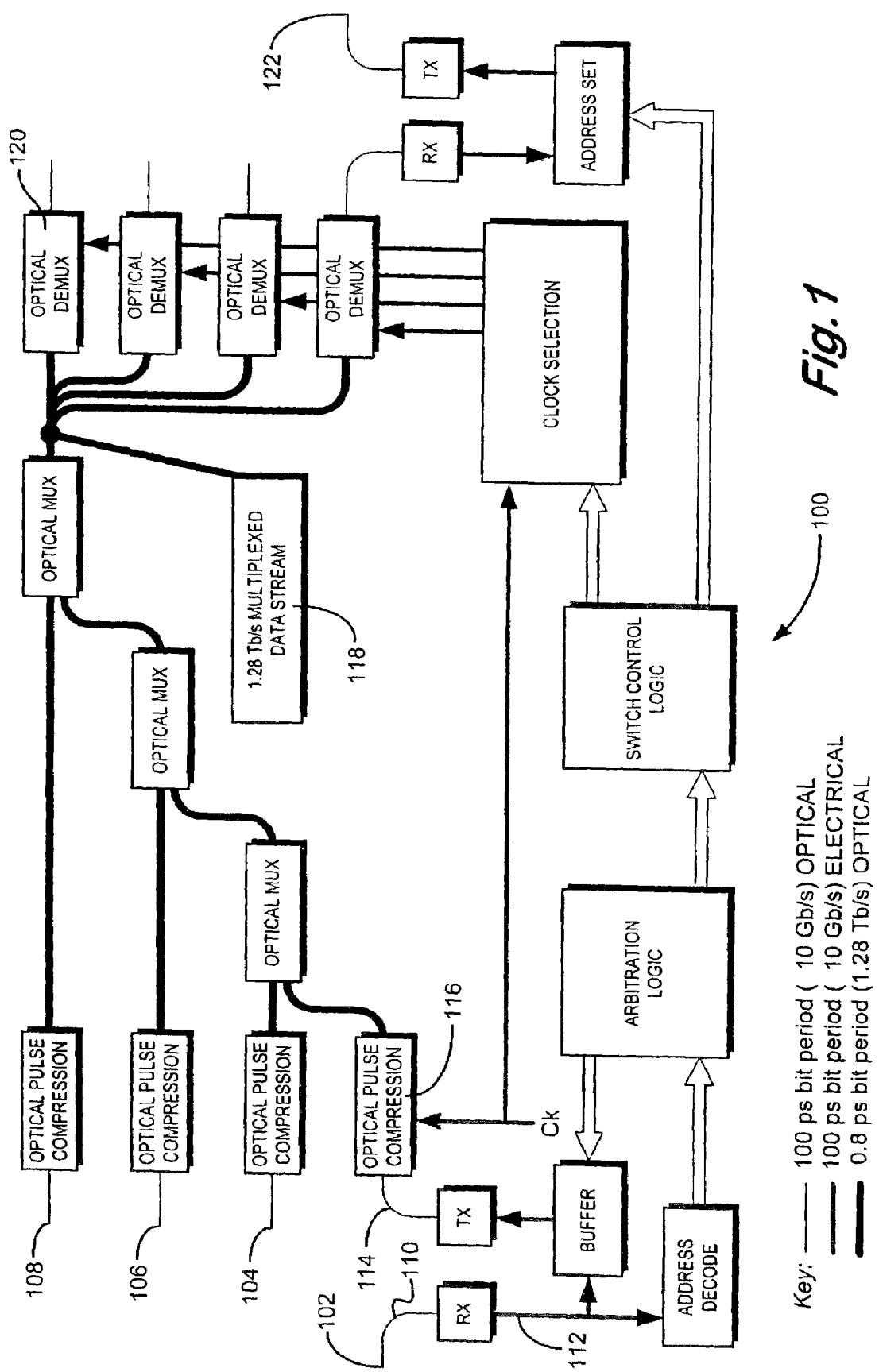
Figure 2:
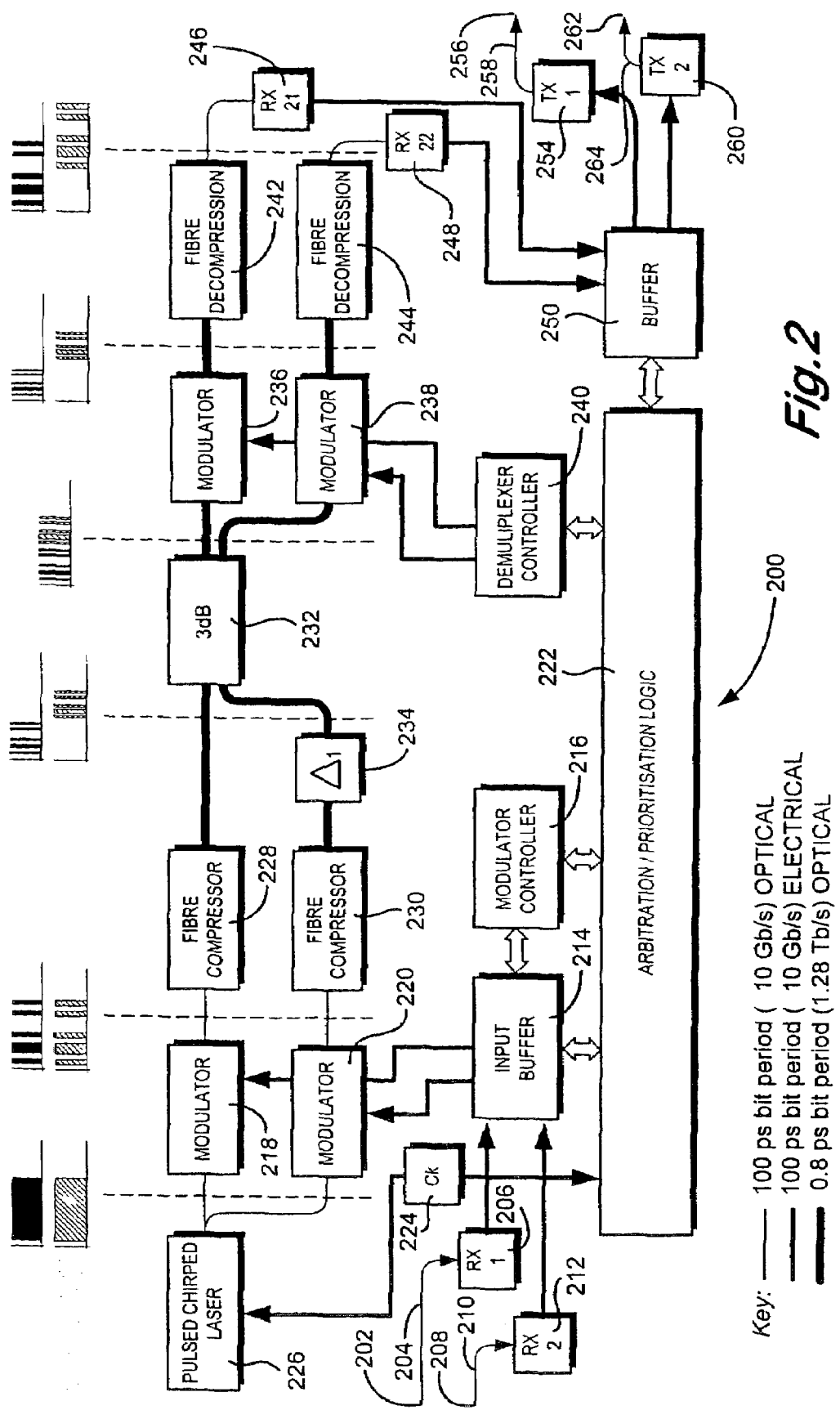
FIG. 2 is a schematic diagram of a router employing a data compression apparatus constituting an embodiment of the invention.

FIGS. 4(a) to (f) are graphs of amplitude versus time and frequency versus time for signals present in the apparatus of FIG. 2.

Throughout the description reference will be made to the optical domain, and in particular light in the optical range of the electromagnetic spectrum. It should be understood that it is intended that the term "optical range of the electromagnetic spectrum" includes frequencies in the infrared region of the electromagnetic spectrum.

Referring to FIG. 2, a router 200 comprises a plurality of input channels and a plurality of output channels. However, in the following example, only two input channels and two output channels of the router 200 will be described for the purposes of simplicity of description and hence clarity.

The router 200 has a first input channel 202 comprising a first input optical fibre 204 coupled to an input terminal of a first input receiver transducer 206. Similarly, the router 200 also has a second input channel 208 comprising a second input optical fibre 210 coupled to a second input receiver transducer 212. Both the first and second input receiver transducers 206, 212 are coupled to an input buffer 214 by a 10 Gb/s electrical connection. The input buffer 214 is coupled to a modulator controller 216 by means of an electrical data bus, the modulator controller 216 being coupled to a first modulator 218 and a second modulator 220 by respective 10 Gb/s electrical connections. Both the input buffer 214 and the modulator controller 216 are coupled to an arbitration/prioritisation logic unit 222. A clock unit 224 is coupled to the arbitration/prioritisation logic unit 222 by a 10 Gb/s electrical connection, the clock unit 224 also being connected to a pulsed chirped laser 226 by a 10 Gb/s electrical connection. The pulsed chirped laser 226 is coupled to the first modulator 218 and the second modulator 220 by means of a fibre-optic splitter and a 10 Gb/s optical connection. The first modulator and the second modulator 218, 220 operate at a data rate of 10 Gb/s and are respectively coupled to a first fibre compressor 228 and a second fibre compressor 230 by means of respective 10 Gb/s optical connections.

The first and second fibre compressors 228, 230 are a transmission medium, for example an optical fibre with controlled dispersion characteristics, where the velocity of propagation through the first and second fibre compressors 228, 230 is linearly dependent upon the frequency of the electromagnetic radiation propagating therethrough. The first fibre compressor 228 is coupled to a 3 dB coupler by a 1.26 Tb/s optical connection. The second fibre compressor 230 is coupled to a delay unit 234, for example a predetermined length of optical fibre, by a 1.28 Tb/s optical connection, the delay unit 234 being coupled to the 3 dB coupler 232 by a 1.28 Tb/s optical connection. A first output terminal of the 3 dB coupler 232 is coupled to a first output modulator 236, and a second output terminal of the 3 dB coupler 232 is coupled to a second output modulator 238, both by respective 1.28 Tb/s optical connections. The first output modulator 236 and the second output modulator 238 are both coupled to a demultiplexer controller 240 by a 10 Gb/s electrical connection, the demultiplexer controller 240 being coupled to the arbitration/prioritisation logic unit 222 by an electrical data bus.

The first and second output modulators 236, 238 and the demultiplexer controller 240 operate together to select compressed packets that are destined for output channels to which the first and second output modulator 236, 238 correspond. Typically, the selection is implemented by setting the modulator 236, 238 to an 'off' state. In the 'off' state the modulator 236, 238 (attenuates) an input signal. When a packet destined for a particular output channel is due to exit the coupler 232 (taking account of any delay in the optical fibre between the coupler 232 and the modulator 236, 238) the modulator 236, 238 corresponding to the particular output channel is set to an 'on' state and the compressed packet is passed through the modulator 236, 238 corresponding to the output channel for which the compressed packet is destined. The modulator 236, 238 can also operate so as to divert the required compressed packet (rather than to attenuate the packet).

The first output modulator 236 is coupled to a fibre decompressor 242 by a 1.28 Tb/s optical connection. The second output modulator 238 is coupled to a second fibre decompressor 244 by a 1.28 Tb/s optical connection. The first fibre decompressor 242 is coupled to a first output receiver transducer 246 and the second fibre decompressor 244 is coupled to a second output receiver transducer 248, both by a 10 Gb/s optical connection. The first and second output receiver transducer 246, 248 are both coupled to an output buffer 250 by a 10 Gb/s electrical connection, the output buffer 250 being coupled to the arbitration/prioritisation logic unit 222 by an electrical data bus.

A first output terminal of the buffer 250 is coupled to a first output transmitter transducer 254 for onward transmission of data on a first output channel 256 by means of a first output optical fibre 258. Similarly, a second output terminal of the buffer 250 is coupled to a second output transmitter transducer 260 for onward transmission of data on the second output channel 262 by means of a second output optical fibre 264.

Figure 3:
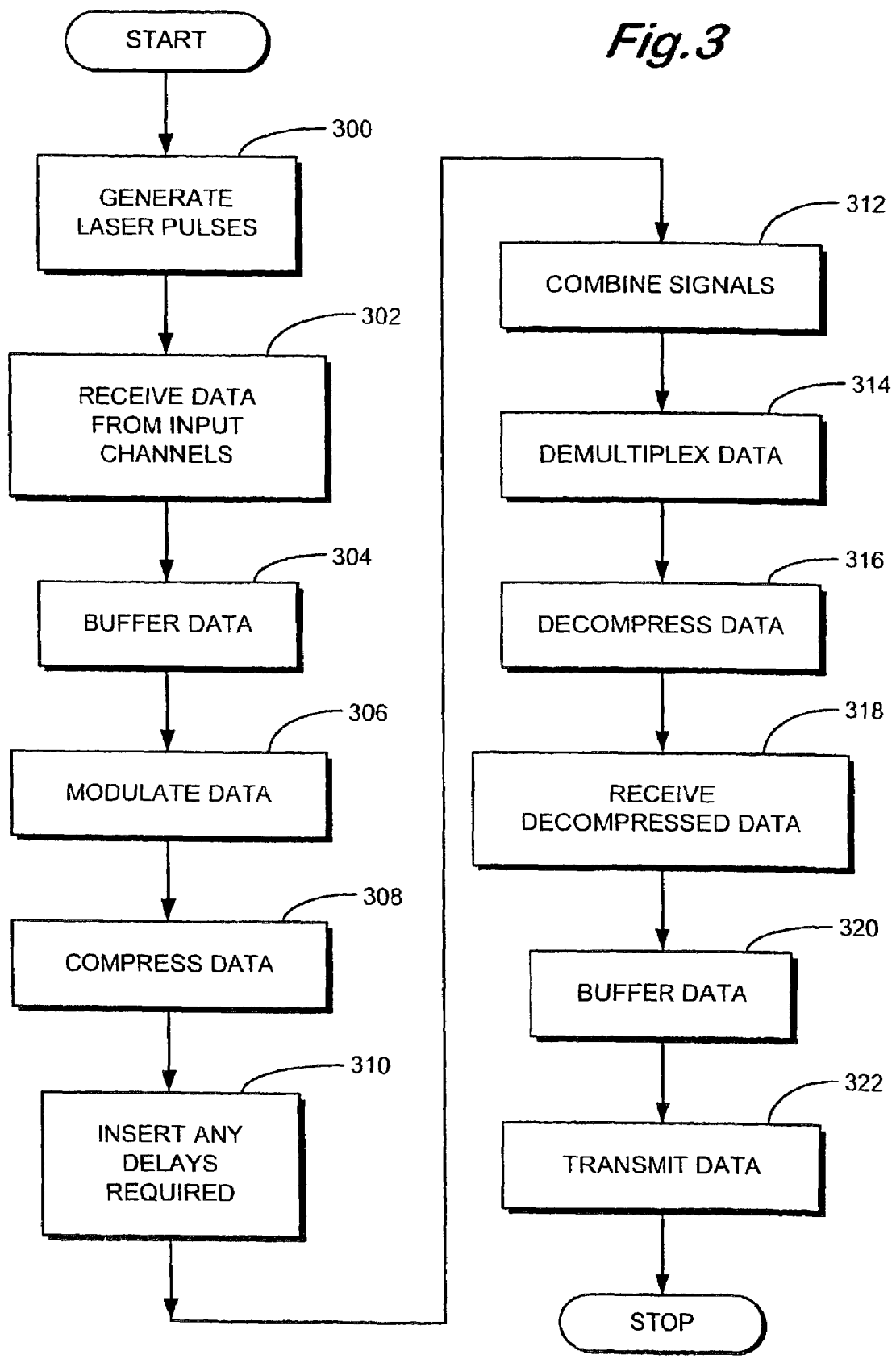
FIG. 3 is a flow diagram of the operation of the router of FIG. 2.
Figure 4:
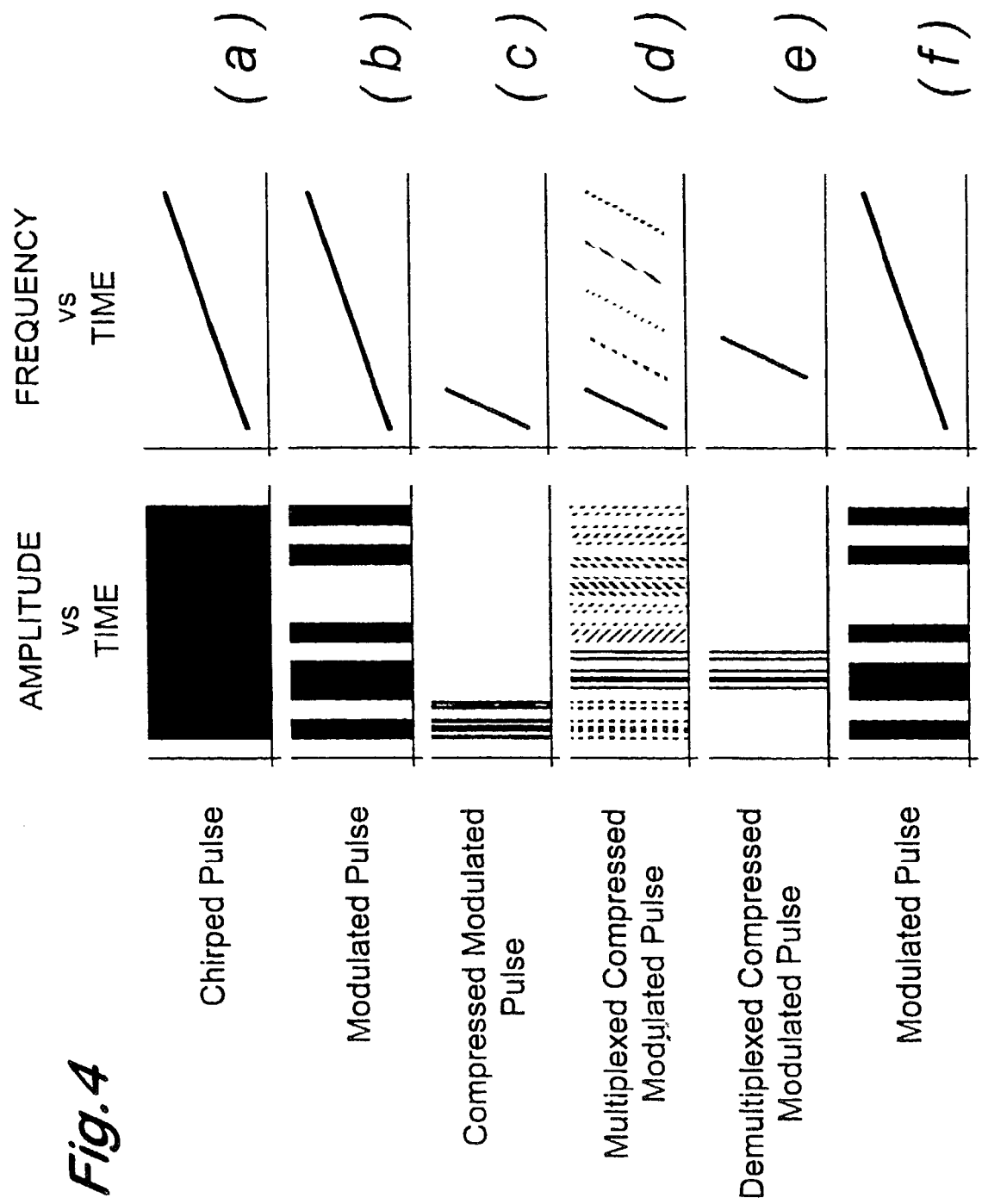

In operation (FIG. 3), the laser 226 generates (step 300) a pulse having a duration corresponding to the length of a packet of data and a linear chirp, i.e. the frequency of the light increases (or decreases) with time during the pulse (FIG. 4 (a)). Packets of data are received (step 302) by the first and second input receiver transducers 206, 212 corresponding to data received on the first and second input channels 202, 208. The data received (step 302) by the first and second input receiver transducer 206, 212 is transferred to the input buffer 214 for buffering (step 304). The buffered data is then transferred to the modulator controller 216 for modulation (step 306) by the first and second modulators 218, 220, the first modulator 218 modulating packet data received on the first input channel 202 and the second modulator 220 modulating data received on the second input channel 208.

Referring to FIG. 4 (b), the amplitude versus the time graph shows an example of data modulated onto a chirped laser pulse, the variation of frequency with time still remaining substantially unchanged.

A first modulated data signal from the first modulator 218 is then compressed (step 308) by the first compressor unit 228. Similarly, a second modulated signal from the second modulator 220 is compressed (step 308) by the second compressor unit 230. An example of a compressed modulated pulse is shown in FIG. 4 (c) where it can be seen that both amplitude and frequency have been compressed in time. In the case of a second modulated data pulse generated by the second compressor unit 230 (and compressed data pulses corresponding to subsequent input channels), a delay $\Delta_1$ is introduced (step 310) to facilitate multiplexing of compressed data pulses. It should be noted that the delay introduced into each compressed modulated data pulse will vary depending upon the input channel to which the compressed modulated data pulse corresponds in order to enable the compressed modulated data pulses to be multiplexed.

By using the first compressor unit 228 and the second compressor unit 230, as the pulse travels through the compressor, the rear of pulses travelling through the first and second compressor units 228, 230 travels faster than the front of the respective pulses, thereby catching-up with the front of the pulse. Consequently, a modulated data pulse exits the first and second compressor units 228, 230 substantially compressed in time.

The compressed modulated data pulse generated by the first compressor unit 228 and the delayed compressed modulated data pulse from the delay unit 234 are multiplexed by the 3 dB coupler 232 (step 312) to form a multiplexed compressed modulated pulse train. Referring to FIG. 4(*d*), it can be seen that the multiplexed data pulses containing compressed modulated data pulses are separated in time.

The multiplexed compressed modulated pulse train generated by the 3 dB coupler 232 is split and sent to the first output modulator 236 and the second output modulator 238 for demultiplexing (step 314).

In this example, packets of data are compressed by a factor of 128 to yield a data rate of 1.28 Tb/s. Therefore, for example, a packet containing 100 bits at 10 Gb/s (having a duration of 10 ns) is compressed to a bit rate of 1.28 Tb/s, whereby the packet duration is 0.08 ns. The data stream generated by the 3 dB coupler 232 has a data rate of 1.28 Tb/s.

The first output modulator 236 and the second output modulator 238 under the control of the demultiplexer controller 240 demultiplex (step 314) the 1.28 Tb/s data stream (FIG. 4(*e*)). The demultiplexer controller 240 ensures the selection of packets of data destined for output channels to which each output modulator corresponds. Consequently, the first output modulator 236 selects packets destined for the first output channel 256 and the second output modulator 238 selects packets destined for the second output channel 262. A first compressed demultiplexed pulse is generated by the first output modulator 236 and forwarded to the first fibre decompressor 242. Similarly, the second output modulator 238 generates a second demultiplexed compressed pulse, which is forwarded to the second fibre decompressor 244. The first and second fibre decompressors 242, 244 decompress (step 316) the first demultiplexed compressed pulse and the second demultiplexed compressed pulse, respectively. The decompressed demultiplexed pulse generated by the first decompressor 242 is received by the first output receiver transducer 246 and the second demultiplexed decompressed signal is received (step 318) by the second output receiver transducer 248. The first and second output receiver transducers 246, 248 convert the optical signals received to 10 Gb/s electrical signals. The signals generated by the first and second output receiver transducers 246, 248 are buffered (step 320) by the output buffer 250 before they are forwarded to the respective first output transmitter transducer 254 and the respective second output transmitter transducer 260.

The first output transmitter transducer 254 converts the received electrical signal destined for the first output channel 256 to a 10 Gb/s optical signal for transmission (step 322). Similarly, the second output transmitter transducer 260 converts the electrical signal destined for the second output channel 262 to a 10 Gb/s optical signal for transmission (step 322).

In this example, instead of routing data on a bit-by-bit basis, the data is routed on a packet-by-packet basis. Consequently, because the demultiplexer controller 240 in conjunction with the modulator 236, 238 only have to select a packet as opposed to a bit i.e. something that is 0.08 ns long rather than 0.8 ps long (in this example), the demodulator technology can be of a very much lower performance and the control of the modulators 236, 238 can be carried out in the electrical domain without the use of 1.28 Tb/s optical clocks.

Although the above example is described in relation to the field of optical switching, the compressed optical signal can be easily converted back to the electrical domain enabling a low-speed modulator to generate a signal at a higher speed (wide bandwidth) than can be generated by the low-speed modulator itself.

Additionally, although the above described compression technique relates to the optical domain, it is envisaged that other electromagnetic waves which will propagate in an optical fibre, but are outside the optical range of the electromagnetic spectrum, can be used. However, a dispersive medium other than an optical fibre will, of course, need to be used, for example, a waveguide at microwave frequencies. Such a technique can also be applied to sound waves.

The invention claimed is:

1. A data compression system, comprising:
   data compression means for generating compressed packets of data contained in a plurality data streams, each data stream comprising a sequence of such packets, each of which packets comprises a plurality of data bits;
   multiplexing apparatus for delaying and multiplexing compressed packets of data from the plurality of data streams into a multiplexed compressed modulated pulse train, each pulse carrying a packet of data, in which compressed modulated data pulses are separated in time;
   modulating apparatus for separating compressed modulated data pulses from the multiplexed compressed modulated pulse train into separate compressed modulated pulse trains, one for each data stream; and
   decompression apparatus for decompressing the compressed modulated data pulses of each compressed modulated pulse train,
   wherein:
   said data compression means comprises a source of coherent electromagnetic radiation coupled to a plurality of pulse compressors, via respective modulators;
   the source generates chirped pulses of electromagnetic radiation, each of which pulses has a frequency that varies over time, throughout its duration, in one of a monotonically increasing manner and a monotonically decreasing manner;
   each modulator is configured to modulate respective chirped pulses with continually varying data of a respective packet to form a modulated chirped pulse, such that each modulated chirped pulse contains a series of individual pulses corresponding to the data bits constituting an entire packet of data;
   propagation time of the modulated chirped pulses through the pulse compressor is linearly dependent upon the frequency of the electromagnetic radiation constituting the modulated chirped pulse, whereby said series of data bits constituting an entire packet of data is compressed as said modulated chirped pulse on which they are modulated propagates through the pulse compressor;
   the modulating apparatus is arranged to select compressed chirped modulated pulses from the multiplexed compressed modulated pulse train, to generate respective streams of compressed data packets;
   for each respective stream of compressed data packets, said decompression apparatus comprises a detector of electromagnetic radiation coupled to the modulating apparatus via a pulse decompressor; and each selected compressed modulated chirped pulse of electromagnetic radiation propagates within a pulse decompressor in which a propagation time of said pulses is linearly dependent upon the frequency of the electromagnetic radiation, so as to decompress the selected compressed modulated chirped pulse.

2. The system as claimed in claim 1, wherein each pulse compressor is a propagation medium.

3. The system as claimed in claim 2, wherein said propagation medium has controlled dispersion characteristics.

4. The system as claimed in claim 2, wherein each modulated chirped pulse has a leading end and a lagging end, the lagging end being arranged to travel faster in said data compression means than the leading end of the modulated pulse.

5. The system as claimed in claim 4, wherein a property of the propagation medium is such that the lagging end of the modulated pulse exiting the medium is closer to the leading end of the modulated pulse than when the modulated pulse was launched into the medium.

6. The system as claimed in claim 2, wherein the propagation medium is an optical fiber.

7. The system as claimed in claim 1, wherein the source of electromagnetic radiation is a laser.

8. The system as claimed in claim 1, wherein the chirped pulse has a frequency that varies linearly with time.

9. The system as claimed in claim 1, wherein the pulse compressor is a dispersive fiber grating.

10. A router comprising apparatus as claimed in claim 1.

11. A method of data compression and transmission, comprising:

generating compressed packets of data contained in a plurality of data streams, each data stream comprising a sequence of such packets, each of which packets comprises a plurality of data bits;

delaying and multiplexing compressed packets of data from the plurality of data streams into a multiplexed compressed modulated pulse train, each pulse carrying a packet of data, in which compressed modulated data pulses are separated in time;

separating compressed modulated data pulses from the multiplexed compressed modulated pulse train into separate compressed modulated pulse trains, one for each data stream; and decompressing the compressed modulated data pulses of each compressed modulated pulse train;

wherein, said step of generating compressed packets of data itself comprises:

providing a source of coherent electromagnetic radiation;

said source generating chirped pulses of coherent electromagnetic radiation, each of said pulses having a frequency that varies over time, in one of a monotonically increasing manner and a monotonically decreasing manner;

modulating each respective chirped pulse with continually varying data of a respective packet to form a modulated chirped pulse, such that each modulated chirped pulse contains a series of individual pulses that correspond to the data bits constituting an entire packet of data;

launching the modulated chirped pulses into a pulse compressor in which propagation time of the modulated chirped pulses through the pulse compressor is linearly dependent upon the frequency of the electromagnetic radiation constituting the modulated chirped pulses, whereby said series of data bits constituting the entire packet is compressed as the chirped pulse on which they are modulated propagates through the pulse compressor; and selecting compressed modulated chirped pulses from the multiplexed compressed modulated pulse train to generate respective streams of compressed data packets; and wherein, for each respective stream of compressed data packets, said step of decompressing comprises selecting compressed modulated chirped pulses, and launching the selected compressed modulated chirped pulses through a decompressor in which a propagation time of said pulses is a time linearly dependent upon the frequency of the electromagnetic radiation, so as to decompress the selected compressed modulated chirped pulse.

\* \* \* \* \*

UNITED STATES PATENT AND TRADEMARK OFFICE
CERTIFICATE OF CORRECTION

PATENT NO. : 7,623,795 B1  Page 1 of 1
APPLICATION NO. : 10/048400
DATED : November 24, 2009
INVENTOR(S) : John Mansbridge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1417 days.

Signed and Sealed this

Fourteenth Day of December, 2010

David J. Kappos
*Director of the United States Patent and Trademark Office*